US011557211B2

(12) United States Patent
Chow et al.

(10) Patent No.: US 11,557,211 B2
(45) Date of Patent: Jan. 17, 2023

(54) SYSTEM AND METHOD FOR REMOTE VIEWING OF VEHICLES USING DRONES

(71) Applicant: Capital One Services, LLC, McLean, VA (US)

(72) Inventors: Chih-Hsiang Chow, Plano, TX (US); Elizabeth Furlan, Plano, TX (US); Steven Dang, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 288 days.

(21) Appl. No.: 16/986,782

(22) Filed: Aug. 6, 2020

(65) Prior Publication Data

US 2022/0044574 A1 Feb. 10, 2022

(51) Int. Cl.
*G08G 5/00* (2006.01)
*H04N 7/18* (2006.01)
*H04N 5/232* (2006.01)
*G01C 21/20* (2006.01)
*B64C 39/02* (2006.01)

(52) U.S. Cl.
CPC ......... *G08G 5/0034* (2013.01); *B64C 39/024* (2013.01); *G01C 21/20* (2013.01); *G08G 5/0069* (2013.01); *H04N 5/23296* (2013.01); *H04N 7/185* (2013.01); *B64C 2201/027* (2013.01); *B64C 2201/127* (2013.01); *B64C 2201/141* (2013.01)

(58) Field of Classification Search
CPC .... G08G 5/0034; G08G 5/0069; G01C 21/20; B64C 39/024; B64C 2201/127; B64C 2201/141; H04N 7/185; H04N 5/23296
See application file for complete search history.

(56) References Cited

U.S. PATENT DOCUMENTS

| 8,818,572 | B1 | | 8/2014 | Tofte et al. | |
|---|---|---|---|---|---|
| 10,200,659 | B2 | * | 2/2019 | Smolyanskiy | ........ B64C 39/024 |
| 10,319,243 | B2 | | 6/2019 | Kreiner et al. | |
| 10,497,108 | B1 | * | 12/2019 | Knuffman | .......... G06Q 10/1097 |
| 10,585,439 | B2 | | 3/2020 | Buttolo et al. | |
| 2017/0124884 | A1 | * | 5/2017 | Shaw | .................... G08G 5/0013 |
| 2018/0155057 | A1 | * | 6/2018 | Irish | ........................ H04L 67/12 |
| 2019/0055015 | A1 | * | 2/2019 | Allard | .................. G05D 1/0094 |
| 2019/0227570 | A1 | | 7/2019 | Miller et al. | |

* cited by examiner

*Primary Examiner* — Aniss Chad
*Assistant Examiner* — Christine Nguyen Huynh
(74) *Attorney, Agent, or Firm* — James Pingor

(57) ABSTRACT

Systems, methods, and computer-readable storage media for generating a flight path for aerial drones around parked vehicles, where the flight path navigates an aerial drone to specific locations associated with predetermined views of the vehicle. A remotely located user can select from a list of predetermined views where the drone should travel, and the computer system can direct the drone to a location associated with the selected view, align the camera on the drone to capture the selected view, and relay live video of the selected view of the parked car to the user.

19 Claims, 6 Drawing Sheets

SYSTEM AND METHOD FOR REMOTE VIEWING OF VEHICLES USING DRONES

BACKGROUND

1. Technical Field

The present disclosure relates to remote viewing of vehicles using drones, and more specifically to remotely directing aerial drones to specific locations around a vehicle such that a remote user can select specific views of the vehicle.

2. Introduction

When looking to purchase a vehicle, a common process is for buyers to visit the car dealership and visually inspect potential vehicles. The buyers can look in the windows, at the tires, walk around the vehicle, etc., to decide if they want to purchase a specific vehicle. However, many people are unable to physically visit the car dealership and look at cars.

A solution to many remote viewing needs is a webcam, where users can look at a physical location remotely over the Internet or a network. However, webcams are generally stationary and do not provide the user the ability to choose the specific viewing locations and/or angles associated with car viewing. Another possible solution would be to allow users to remotely (over the Internet or network) pilot a drone having a built-in camera. However, lag from network delays, lack of user skill in piloting drones, possible property damage from wind (e.g., the drone being blown into the vehicle or a nearby vehicle), and other issues make this solution technically insufficient.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include receiving, at a server from a remote terminal, a first request to remotely view a vehicle using an aerial drone, wherein the remote terminal electrically contacts the server across a network; providing, from the server to the remote terminal, a list of predetermined views of the vehicle; receiving, at the server from the remote terminal, a selection of one of the predetermined views from the list of predetermined views, resulting in a first predetermined view; generating a flight path for the aerial drone by: receiving coordinates for the vehicle; receiving an orientation of the vehicle; calculating, based on the orientation and the predetermined views, a plurality of viewing vectors for a camera of the aerial vehicle which respectively correspond with the list of predetermined views for the vehicle; calculating, based at least in part on a wind speed at the vehicle, locations for the viewing vectors, where each location in the locations corresponds to a viewing vector in the plurality of viewing vectors; identifying routes between the locations which are traversable by the aerial drone; and connecting the routes, forming the flight path; transmitting, to the aerial drone from the server, the flight path; receiving, at the server from the aerial drone, a video feed bitstream from the first predetermined view in the list of predetermined views, the first predetermined view generated by the aerial drone being located at a first location and the camera pointing at a corresponding first vector; and transmitting, from the server to the remote terminal, the video feed bitstream.

A system configured to perform the concepts disclosed herein can include a processor; and a non-transitory computer-readable storage medium having instructions stored which, when executed by the processor, cause the processor to perform operations comprising: receiving, from a remote terminal, a request to remotely view a vehicle using an aerial drone; transmitting, to the remote terminal, a list of potential views of the vehicle; receiving, from the remote terminal, a selected view from the list of potential views; generating a first flight path for the aerial drone by: receiving coordinates for the vehicle; receiving an orientation of the vehicle; calculating, based on the orientation and the list of potential views, a plurality of locations of the aerial vehicle which respectively allow a camera of the aerial vehicle to capture views from the list of predetermined views for the vehicle; identifying routes between the plurality of locations which are traversable by the aerial drone; and connecting the routes, forming the first flight path; identifying a first location within the plurality of locations corresponding to the selected view; generating a second flight path for the aerial drone by: identifying flight paths of other aerial drones within a predetermined distance of the vehicle; identifying locations of other vehicles within the predetermined distance of the vehicle; and calculating a shortest path from a current location of the aerial drone to the first location while avoiding the flight paths of the other aerial drones and not flying over the locations of the other vehicles, resulting in a second flight path; transmitting, to the aerial drone from the server using a wireless transmitter, the first flight path and the second flight path; and transmitting, to the aerial drone from the server using the wireless transmitter, instructions for the aerial drone to proceed from the current location to the first location using the second flight path.

A non-transitory computer-readable storage medium configured as disclosed herein can have instructions stored which, when executed by a computing device, cause the computing device to perform operations which include receiving, at a server from a remote terminal, a first request to remotely view a vehicle using an aerial drone, wherein the remote terminal electrically contacts the server across a network; providing, from the server to the remote terminal, a list of predetermined views of the vehicle; receiving, at the server from the remote terminal, a selection of one of the predetermined views from the list of predetermined views, resulting in a first predetermined view; generating a flight path for the aerial drone by: receiving coordinates for the vehicle; receiving an orientation of the vehicle; calculating, based on the orientation and the first predetermined view, coordinates for the first predetermined views of the vehicle; transmitting the coordinates from the server to the aerial drone and instructing the drone to proceed to the coordinates; receiving, from the aerial drone, a video feed from a camera on the aerial drone while the aerial drone hovers at a specific location at the coordinates; and transmitting, to the remote terminal, the video feed bitstream while the aerial drone hovers at the specific location.

DETAILED DESCRIPTION

Figure 1:
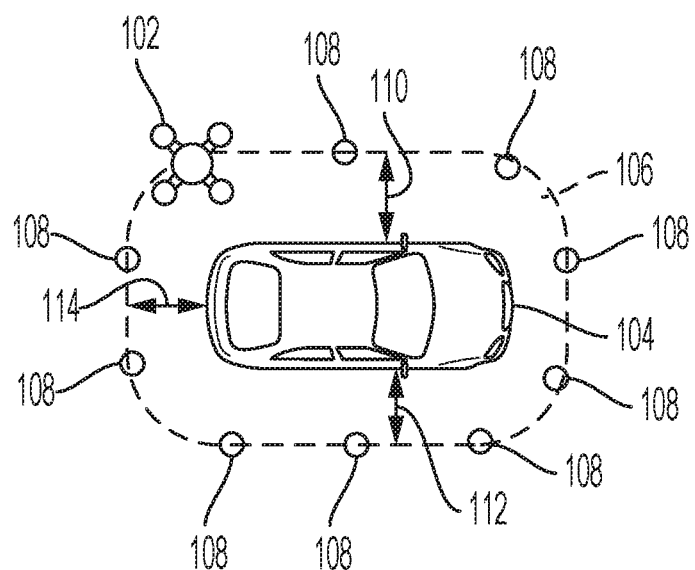
FIG. 1 illustrates an example overhead view of a vehicle, an aerial drone, and a flight path of the aerial drone.

Various embodiments of the disclosure are described in detail below. While specific implementations are described, it should be understood that this is done for illustration purposes only. Other components and configurations may be used without parting from the spirit and scope of the disclosure.

Systems and methods configured according to this disclosure allow remote users to request, through a computer system, live views of a vehicle to be transmitted over the Internet (or other networks). The live views of the vehicle are generated by an aerial drone moving to a specific location associated with a requested view and pointing a camera on the aerial drone at a specific angle or vector. The camera captures the requested view of the vehicle as images, then transmits the images across the network to the user's computer system as a video feed. In this manner, the remotely located user can have a live view of the vehicle they wish to inspect. Consider the following example.

A user is sitting at home and wishes to look at new cars at car dealership. The user, using a computer system (such as a desktop computer, laptop, smartphone, tablet, etc.) visits a website associated with a car dealership, and is provided a list of vehicles currently stored in the dealership's parking lot. The user selects one of the vehicles from the list, and the user then receives a list of predetermined views of the vehicle. For example, some of the views might be "Inside the front passenger window," "Back left tire," "Driver's side hood." The user can then select a predetermined view from the list provided.

A server or computer system receiving the user's selection can operate to generate a flight path for an aerial drone to provide the requested predetermined view(s). For example, the system can obtain the location of the vehicle, for example coordinates (e.g., latitude, longitude, orientation) of the vehicle, as well as the dimensions of the vehicle, and calculate (based on those coordinates and/or dimensions) viewing vectors for a camera mounted on the aerial drone to achieve the predetermined views. The system can also calculate locations (latitude, longitude, and altitude) where the aerial drone will be able to capture the requested view and those viewing vectors. In some configurations, these locations may vary based on wind speed, locations of other aerial drones, and/or other vehicles. Routes are identified between the locations where the aerial drone can capture the desired viewing vectors, and the routes are combined together to form a flight path for the vehicle. The system can then transmit the flight path generated to the aerial drone.

The aerial drone can then proceed to the predetermined view selected by the user, or more specifically can maneuver to the location (latitude, longitude, altitude) within the flight path where it can point the camera at the angle/vector needed for the viewing vector associated with the predetermined view. The camera can generate a video feed which is transmitted to the computer system, which relays the video feed to the user's computer system, allowing the user to have a live view of the vehicle.

If the user wishes to see a different view of the vehicle, the user can select a different predetermined view from the list previously sent, then that selection can be sent to the system which instructs the aerial drone to proceed to a different location within the flight plan. In this manner, the user does not have actual control of the aerial drone—only the ability to direct it to specific, predetermined views. Because the user is not actually controlling the aerial drone, only directing it to those specific, predetermined views, lag associated with transmitting the instructions over the Internet (or other network) does not affect the control of the aerial drone, resulting in a safer and improved technical system. For example, it is less likely that the user could accidently pilot the drone into another vehicle or into an individual, possibilities that exist outside the disclosed systems and methods.

Preferably, the flight path forms a partial cylinder, or open dome, around the selected vehicle. That is, the locations corresponding to the predetermined views allow for the drone to be located at points on all sides of the vehicle, such that the flight path forms a contiguous circle of routes around the vehicle, but preferable not directly over the vehicle (or within a predetermined distance of the exterior of the vehicle). In addition, the locations can vary based on the curvature of the vehicle. For example, consider the situation where, based on the wind and/or other factors, the drone is to stay one meter away from the exterior of the vehicle. As the aerial drone moves vertically to different locations within the flight path, the curvature of the vehicle may vary, allowing the locations within the flight path to move horizontally closer to the vehicle while maintaining that one meter distance.

In circumstances where the flight path of an aerial drone would interfere with the flight path of another aerial drone at a nearby vehicle, the aerial drone can be placed into a queue and wait to approach the vehicle until the other aerial drone is no longer in an interfering location. In other configurations, the list of predetermined views available to the user can be adjusted based on the presence of nearby drones. For example, if a first flight path of a first aerial drone would interfere with a second flight path of a second aerial drone, the second flight path could be adjusted so that only the locations (and associated views) which do not interfere with the first flight path are available. In other words, the second user may only have a partial list of available views because the remaining views (and that portion of the second flight path) are blocked by the first aerial drone. Once the first aerial drone completes their viewing, the second user can be provided the full list of predetermined views and the second flight path can be re-adjusted to allow all of the locations and views.

To direct aerial drones to the specified vehicles, the system can identify (using cameras, GPS (Global Positioning System) coordinates transmitted from other drones, flight paths of the other drones) current and/or projected locations of vehicles, drones, and/or individual human beings within a designated area (such as a parking lot). The flight path for the aerial drone to arrive at the selected vehicle can route around or above the obstacles, or can cause the aerial drone to pause while waiting for various obstacles to move.

In some instances, the drone can also move around or under objects. For example, car dealerships often hang banners, or strings of banners, over the cars in their lots. These banners can cause a drone to crash or otherwise become impaired if the drone were to hit the banner. Drones which have flight paths provided as disclosed herein can avoid such obstacles by flying over, below, or around the objects. If, for example, a camera capturing video of the lot where a drone is to operate detects a object which would interrupt a flight plan provided to a drone, the system can modify the flight plan such that the drone descends, passes under or over the banner, then returns to normal altitude. This new, updated flight path can then be communicated wirelessly to the drone. In other configurations, the drone camera can detect the object, which can cause a processor aboard the drone to modify a flight path already delivered, and transmit the newly modified flight path back to a server, which can use the newly updated flight path to ensure other drones do not interfere with the updated flight path.

These and other configurations will be further described in conjunction with additional description of the figures.

FIG. 1 illustrates an example overhead view of a vehicle 104, an aerial drone 102, and a flight path 106 of the aerial drone 102. The flight path 106 includes a number of locations 108 around the vehicle 104 where the aerial drone 102 can hover while capturing video of the vehicle 104, and the routes the aerial drone 102 would take to maneuver between the points 108. As illustrated, preferably the flight path 106 (and by extension, the locations 108) where the aerial drone 102 can hover, form a circle, ellipse, or other series of locations 108 which, when connected by routes between the locations 108, form a contiguous series of routes and locations 108 around the vehicle 104. Also, as illustrated the distance 110, 112, 114 of the flight path 106 from the vehicle 104 can vary based on wind conditions, the presence of other aerial drones, the presence of other vehicles, nearby individual human beings, and/or other conditions. In other situations or circumstances, the distances 110, 112, 114 of the flight path 106 from the vehicle 104 can be equal despite various conditions.

Figure 2:
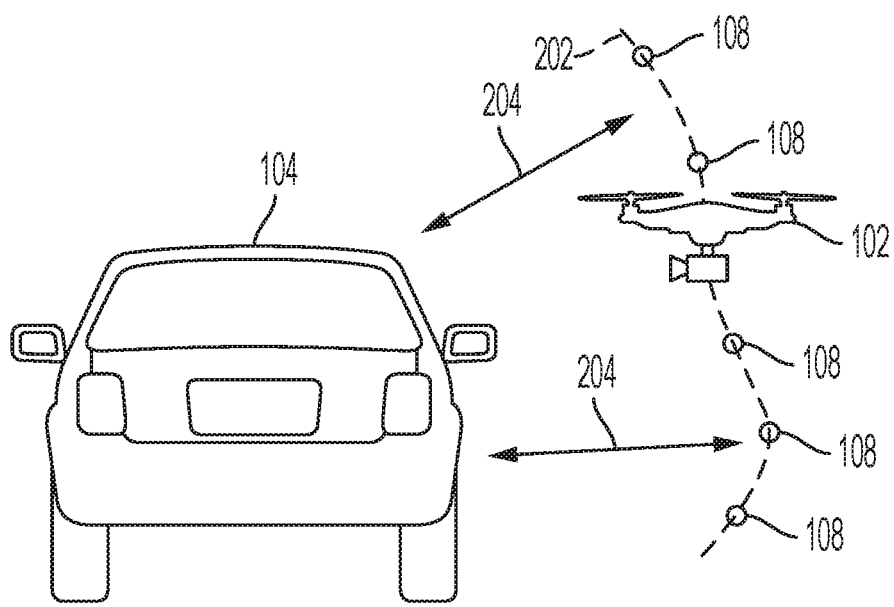
FIG. 2 illustrates an example side view of a vehicle, an aerial drone, and a flight path of the aerial drone.

FIG. 2 illustrates an example side view of a vehicle 104, an aerial drone 102, and a flight path 202 of the aerial drone 102. As illustrated, the flight path 202, contains a number of locations 108 where the aerial drone 102 can hover while capturing video of the vehicle 104, and those locations 108 maintain an equal distance 204 from the vehicle 104. Moreover, as the vehicle 104 may have various curves or changes to the outside dimensions, the locations 108 within the flight path 202 can be adjusted to compensate for those curves, such that, as illustrated, the flight path 202 illustrated is not a straight line. More specifically, the latitude, longitude, and/or altitude of the location 108 can vary bad on the curvature of the vehicle 104 to allow the camera of the drone 102 to capture the desired angle needed for a specific predetermined view.

In other configurations, the flight path can be linear (or otherwise not adjust to the curvature of the vehicle), and a level of zoom/magnification of the camera aboard the drone 102 can be adjusted based on the distance 204 to the vehicle.

Figure 3A:
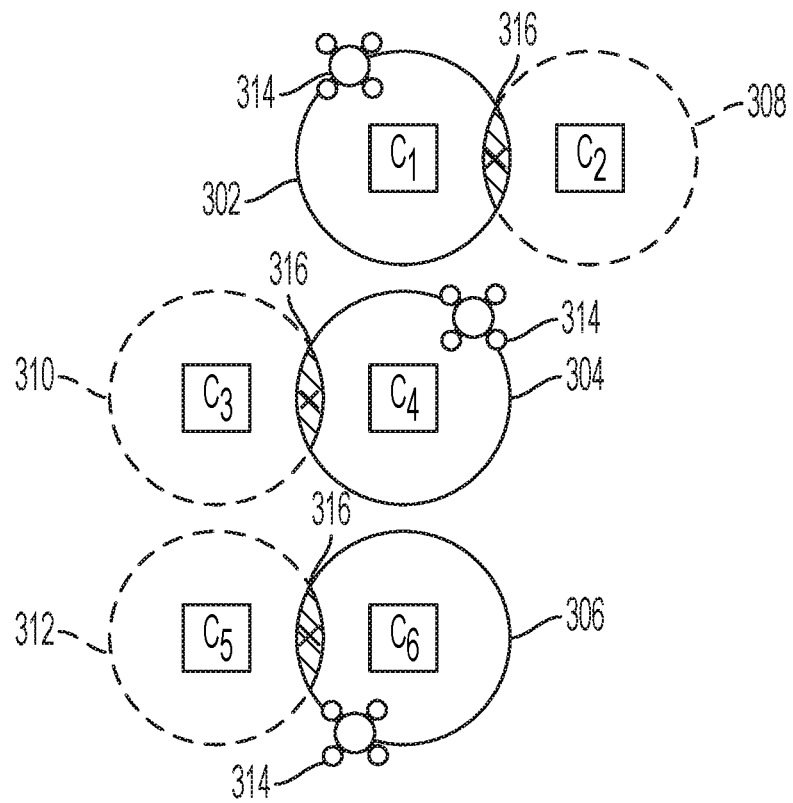
FIG. 3A illustrates a first example of allowed and disallowed flight paths within a parking lot.

FIG. 3A illustrates a first example of active flight paths 302, 304, 306 and disallowed flight paths 308, 310, 312 within a parking lot. The active flight paths 302, 304, 306 have drones 314 circling cars which have been selected by users, with the drones 314 recording live video of the cars and transmitting that video over the Internet to the users. Disallowed flight paths 308, 310, 312 would conflict with the active flight paths 302, 304, 306. For example, flight path 302 circles vehicle C1. If another drone were to circle vehicle C2 using flight path 308, the two flight paths would interfere in area 316. Similar conflicts 316 exist between flight paths 310 and 304, and 312 and 306. When a vehicle is selected to be viewed, a flag may be set for those vehicles that may have conflicting flight paths. For example, if vehicle C4 is being viewed, a flag may be set for vehicle C3 indicating that vehicle C3 cannot be viewed at this time.

In such circumstances, the users requesting aerial drones 314 which would operate the disallowed flight paths 308, 310, 312 can be placed in a queue to wait for the active flight path 302, 304, 306 drones 314 to respectively finish and return to a storage/charging area, at which time a drone can launch and engage with the vehicles.

Figure 3B:
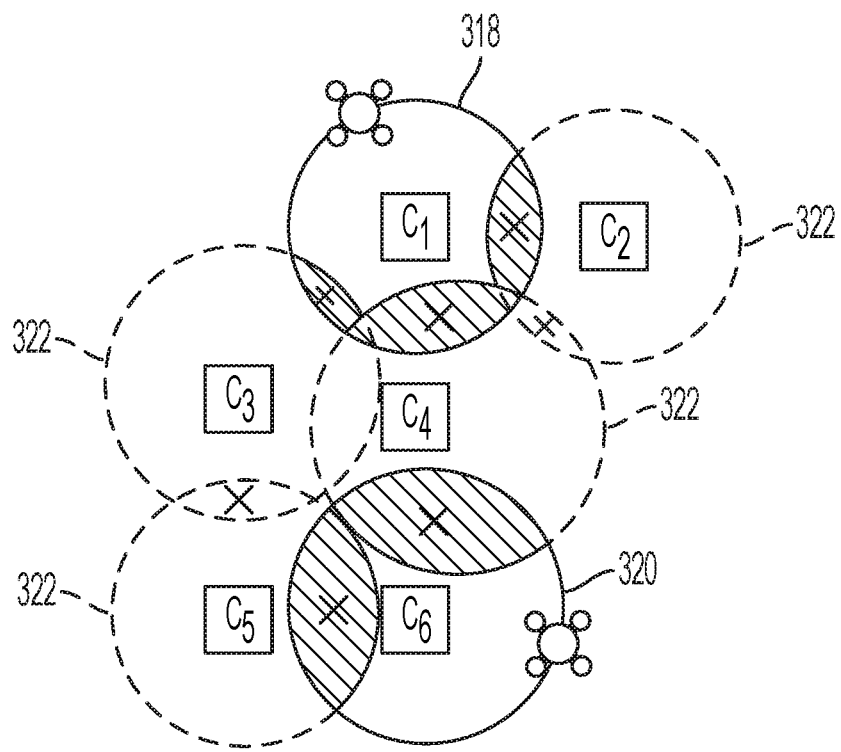
FIG. 3B illustrates a second example of allowed and disallowed flight paths within a parking lot.

FIG. 3B illustrates a second example of active 318, 320 and disallowed flight paths 322 within a parking lot. However, in this example the active flight paths 318, 320 are substantially larger than the active flight paths 302, 304, 306 of FIG. 3A. These larger flight paths 318, 320 impede any additional flight paths 322 for nearby vehicles, such that even vehicles which are located in different rows are prohibited while the active flight paths 318, 320 remain active. If an active flight path 318, 320 ends with the drone returning to base, the system can determine if any of the disallowed flight paths 322 are then available. If there is a user request queued awaiting a disallowed flight path 322, that queued user can then initiate viewing of a desired vehicle.

Figure 4:
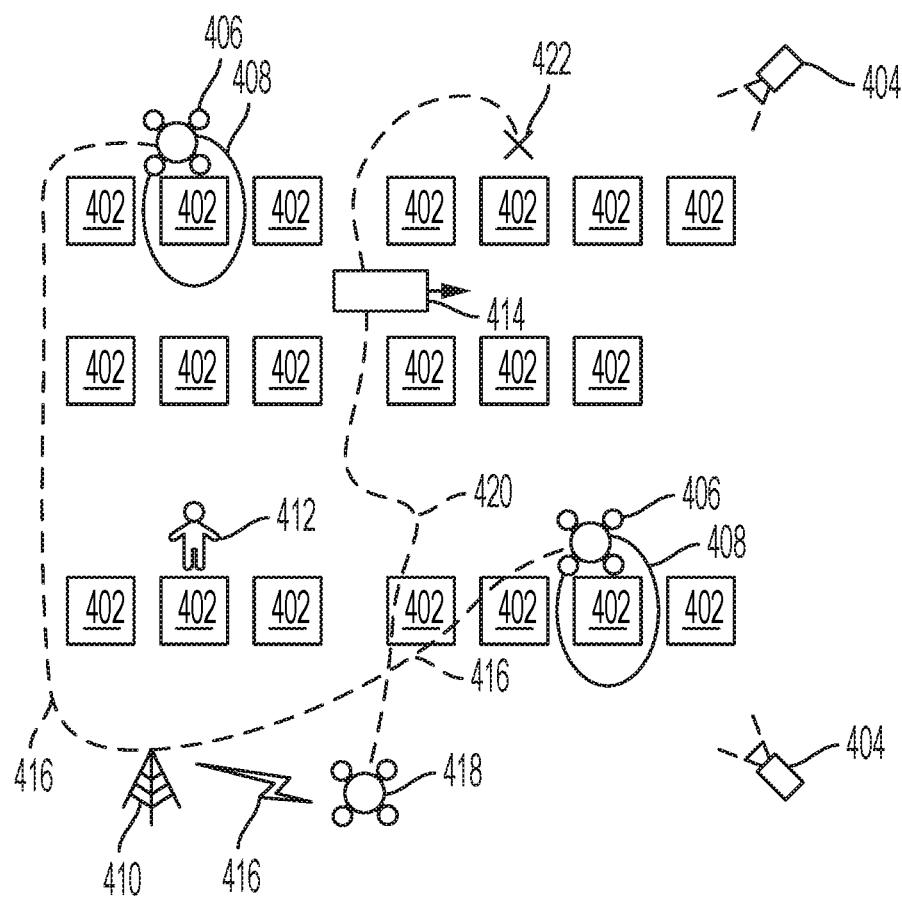
FIG. 4 illustrates an example of a parking lot equipped with cameras and drones being used to view parked vehicles.

FIG. 4 illustrates an example of a parking lot equipped with cameras 404 and drones 406 being used to view parked vehicles 402. The drones 406, 418 communicate 416 with an antenna 410 to receive instructions from a central computing system, relay video, provide current location information, provide locations of vehicles 402 or other obstacles, etc. The cameras 404 capture video footage of parked vehicles 402, moving vehicles 414, active aerial drones 406 (those drones currently providing video of a designated parked car), and individuals 412 within the parking lot. The central computer receives the video footage from the cameras 404 and/or the active aerial drones 406 and processes the video, identifying the objects detected within the video, comparing locations of those detected objects with previous locations, and establishing vectors for movement of the detected objects as well as predicted locations of the detected objects.

When a user selects a vehicle to view remotely, the system can assign an aerial drone 418 to travel from a starting location to the vehicle. In some cases, the starting location can be a "home base" where the aerial drones are stored, whereas in other cases the starting location can be another parked vehicle where the aerial drone recently finished providing video. The central computer can generate a flight path 420 for the newly assigned drone 418 using the data captured and processed from the cameras 404 and the active drones 406, as well as the flight paths 408 for those active drones 406, to arrive at the desired vehicle 422. As illustrated, the planned flight path 420 for the newly assigned drone 418 can cause the drone to maneuver so as to not fly directly over parked vehicles 402 and avoid moving vehicles 414 (by either pausing or moving to another position).

Figure 5:
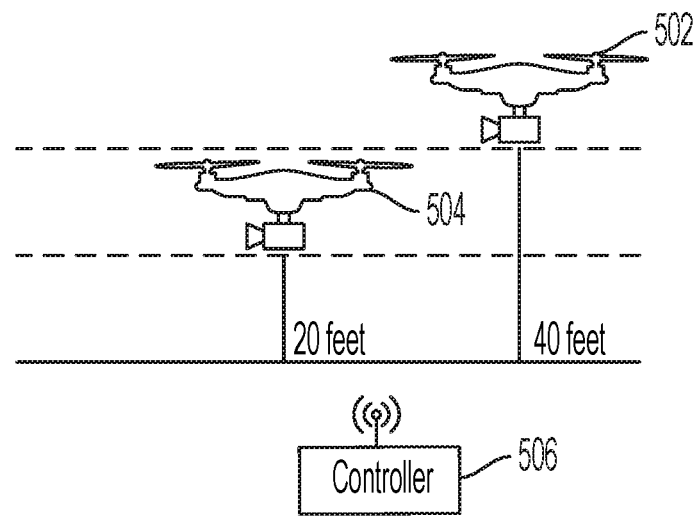
FIG. 5 illustrates an example of drones flying at different altitudes.

FIG. 5 illustrates an example of drones 502, 504 flying at different altitudes. A central computer/controller 506 attached to an antenna can communicate with the drones 502, 504, such that the drones 502, 504 can avoid contact with other drones. For example, by flying within a specific band having a lower altitude and upper altitude, a first drone 504 can monitor a vehicle while a second drone 502 flies above the upper altitude of the band. In this manner, the controller 506 can, in some cases, route the drones 502, 504 more efficiently. In addition, in some cases the drones flying at different altitudes may allow drones to monitor neighboring vehicles, where if the drones 502, 504 flew at the same altitudes their flight paths may interfere with one another.

Figure 6:
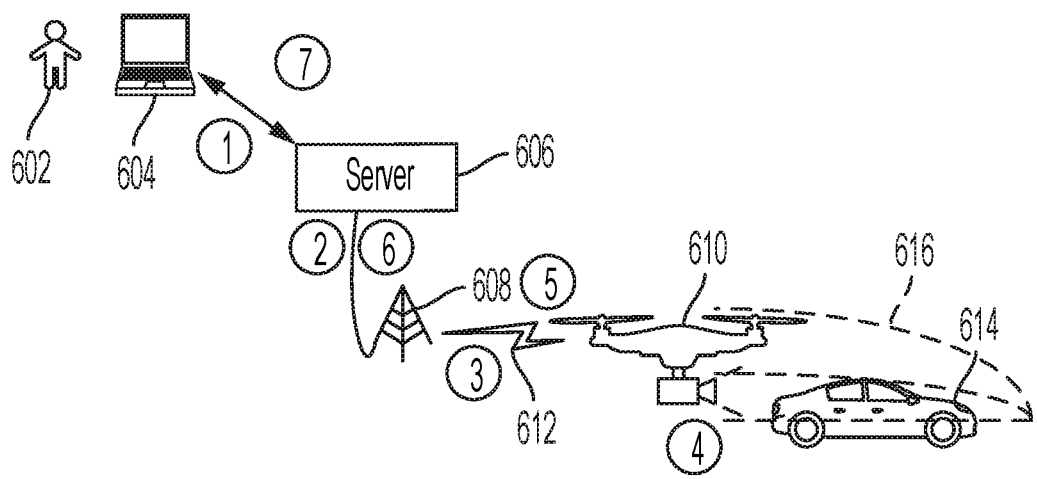
FIG. 6 illustrates an example system as described herein.

FIG. 6 illustrates an example system as described herein. In this example, a user 602 uses a computer system 604 (such as a desktop computer, laptop, tablet, or smartphone) to request (1) a live view of a parked vehicle 614. The request is sent to a server 606, which receives the request and prepares at least one flight path for an aerial drone 610. The at least one flight path can be a flight path 616 identifying locations around the vehicle 614 where the aerial drone 610 can hover to capture specific views of the vehicle 614. The at least one flight path can also be a flight path for the aerial drone 610 to arrive at the vehicle.

Once the server 606 has generated the at least one flight path, the server 606 sends (2) (3) the flight path(s) to the aerial drone 610 using an antenna 608, where the antenna uses (3) a RF (Radio Frequency) signal 612 to communicate with the aerial drone 610. The aerial drone 610 captures (4) the video feed of the vehicle 614 from specific locations within the flight path 616, and transmits back to the server 606 the video feed using (5) the antenna 608, which in turn forwards (6) the video feed to the server 606. The server 606 processes the video feed as needed to communicate with the user's computer 604, then transmits (7) the video feed to the user's computer 604 where the user 602 can view the live feed of the vehicle 614 from the drone 610.

Figure 7:
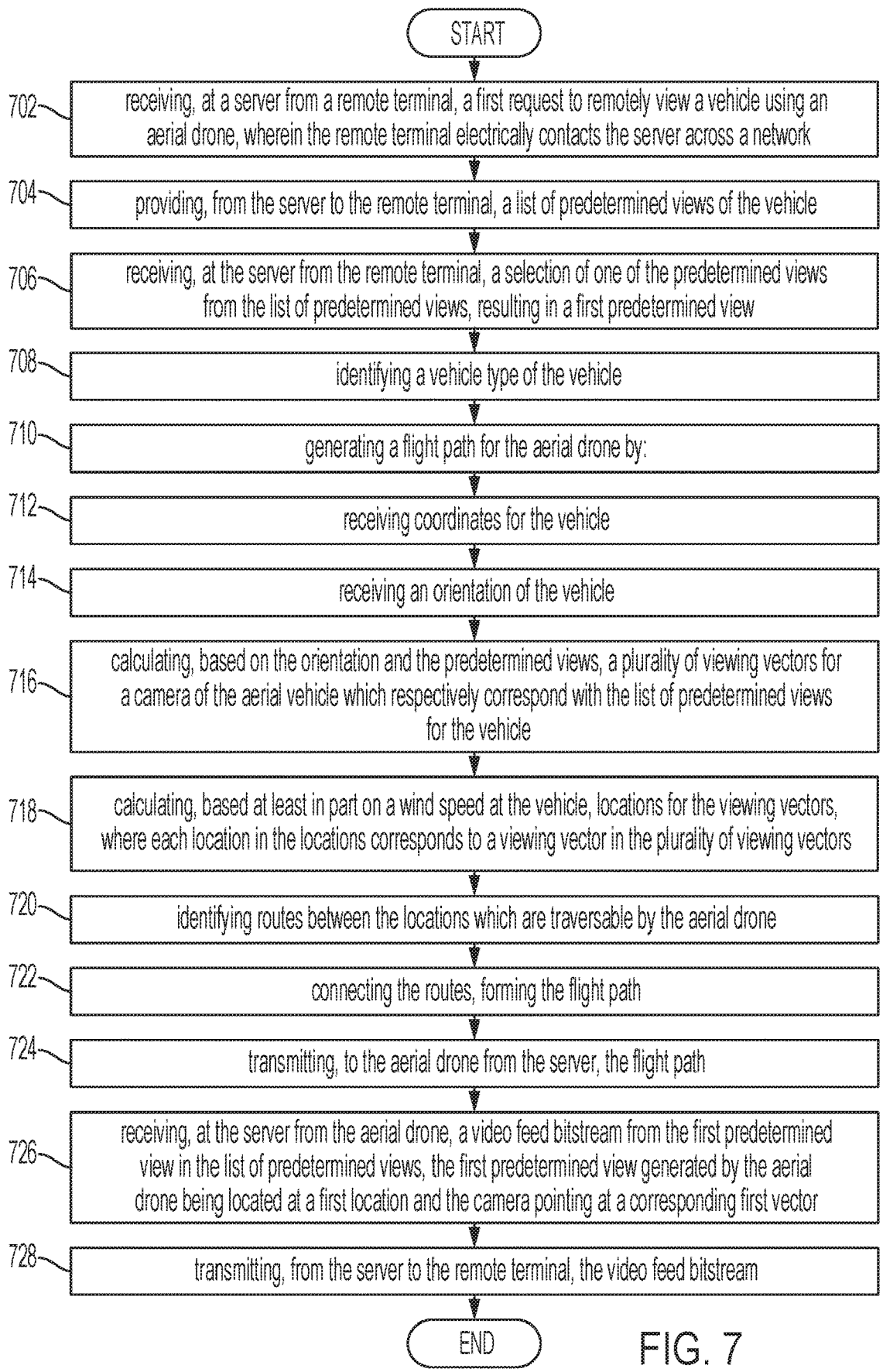
FIG. 7 illustrates an example method embodiment.

FIG. 7 illustrates an example method embodiment which can be executed by a server or other computing system. As illustrated, the method can include receiving, at a server from a remote terminal, a first request to remotely view a vehicle using an aerial drone, wherein the remote terminal electrically contacts the server across a network (702). The server can provide, to the remote terminal, a list of predetermined views of the vehicle (704) and receive, from the remote terminal, a selection of one of the predetermined views from the list of predetermined views, resulting in a first predetermined view (706).

The system can identify a vehicle type of the vehicle (708) and generate a flight path for the aerial drone (710) by receiving coordinates for the vehicle (712). A database may store vehicle information and location. In one example, the locations may be parking space numbers, from which more specific location information may be determined. For example, the database may associate parking space numbers with GPS coordinates for those parking spaces. The GPS coordinates may define a perimeter of the parking space, for example, the four corners of a rectangle. An orientation of the vehicle, for example which way the vehicle is facing in the parking space, is also received (714). The database may also associate the vehicle specifications with the vehicle in the parking space. The vehicle specifications may include the vehicle overall height, width, and length, number of windows and window locations, hood length/width/height, trunk length/width/height, etc. The vehicle specifications may be stored at a central location and retrieved when a view of that vehicle type is requested.

Based on the vehicle location, specification and the predetermined view, a location for the drone to provide the requested view is determined. The locations may be generated dynamically or in advance. The location for the drone to provide the requested view may be GPS coordinates, latitude, longitude information, or other navigational information. In one example, the requested view may be "front driver side." The coordinates for the drone to provide a view of the "front driver side door" are determined. Using the orientation of the vehicle in the parking space, which side of the vehicle is the driver side may be determined. Using the vehicle specifications, how far back from the perimeter of the parking space the front driver side door is located may be determined. The GPS coordinates for that location may be used of the base coordinates for the drone to provide the "front driver side door" view.

Viewing vectors for a camera of the aerial vehicle which respectively correspond with the list of predetermined views for the vehicle may also be determined (716). These angles may be based on the vehicle specifications, such as height, width, etc. and the drone location. In some embodiments locations for the viewing vectors are calculated, based at least in part on a wind speed at the vehicle, where each location in the locations corresponds to a viewing vector in the plurality of viewing vectors (718); routes between the locations which are traversable by the aerial drone are identified (720); and the routes are connected, forming the flight path (722).

The system can then transmit, to the aerial drone, the flight path (724) and receive, from the aerial drone, a video feed bitstream from the first predetermined view in the list of predetermined views, the first predetermined view generated by the aerial drone being located at a first location and the camera pointing at a corresponding first vector (726). The system can then transmit, from the server to the remote terminal, the video feed bitstream (728).

In some configurations, the illustrated method can further include: while continuing to transmit the video feed bitstream: receiving, at the server from the remote terminal, a second request to view a second predetermined view from the list of predetermined views; transmitting, to the aerial drone from the server using the wireless transmitter, instructions to move, according to the flight path, from the first location to a second location associated with the second predetermined view and adjust the camera to a second vector associated with the second predetermined view; receiving, at the server from the aerial drone, the video feed bitstream from the aerial drone at the second location with the camera pointed at the second vector; and transmitting, from the server to the remote terminal, the video feed bitstream of second predetermined view. Such configurations can also include receiving, at the server from the aerial drone, the video feed bitstream while the aerial drone is at the second location and transmitting, from the server to the remote terminal, the video feed bitstream of the aerial drone at the second location.

In some configurations, while the video feed bitstream continues to transmit, the method can further include: receiving, at the server from the remote terminal, a request for a change in an amplification of video captured by the camera and transmitting, from the server to the aerial drone, instructions to change the amplification of the camera.

In some configurations, the flight path can further include, for each of the predetermined coordinates: a latitude of the coordinate; a longitude of the coordinate; an altitude of the coordinate; and an orientation of the camera. In such cases, the flight path can further include a route from each predetermined coordinate in the predetermined coordinates to adjacent predetermined coordinates, such that the flight path encircles the parked vehicle. Additionally, the latitude, the longitude, and the altitude of the flight path can result in a constant distance of the aerial drone from edges of the parked vehicle while in the flight path.

In some configurations, the illustrated method can further include generating a route for the aerial drone to the flight path through a parking lot where the parked vehicle is located, the route avoiding flying over parked vehicles and avoiding flight paths of other aerial drones.

In some configurations, the illustrated method can further include generating, using video streams from a plurality of cameras, locations of additional vehicles and human beings within a parking lot where the parked vehicle is located, identifying which of the locations of additional vehicles currently have aerial drones assigned or have human beings present, resulting in occupied parking spaces, determining that the parked vehicle is immediately proximate to at least one of the occupied parking spaces, and placing the aerial drone into a queue prior to transmitting the flight path to the aerial drone while the at least one occupied parking space immediately proximate to the parked vehicle continues to be occupied. In such configurations, the identifying of the occupied parking spaces can further include retrieving flight paths for the additional aerial drones operating in the occupied parking spaces and determining that the flight path of the aerial drone would interfere with at least one of the flight paths for the additional aerial drones.

In some configurations, the flight path encircles the parked vehicle, and wherein the flight path is closer to the parked vehicle when the wind speed is low than when the windspeed is high.

Figure 8:
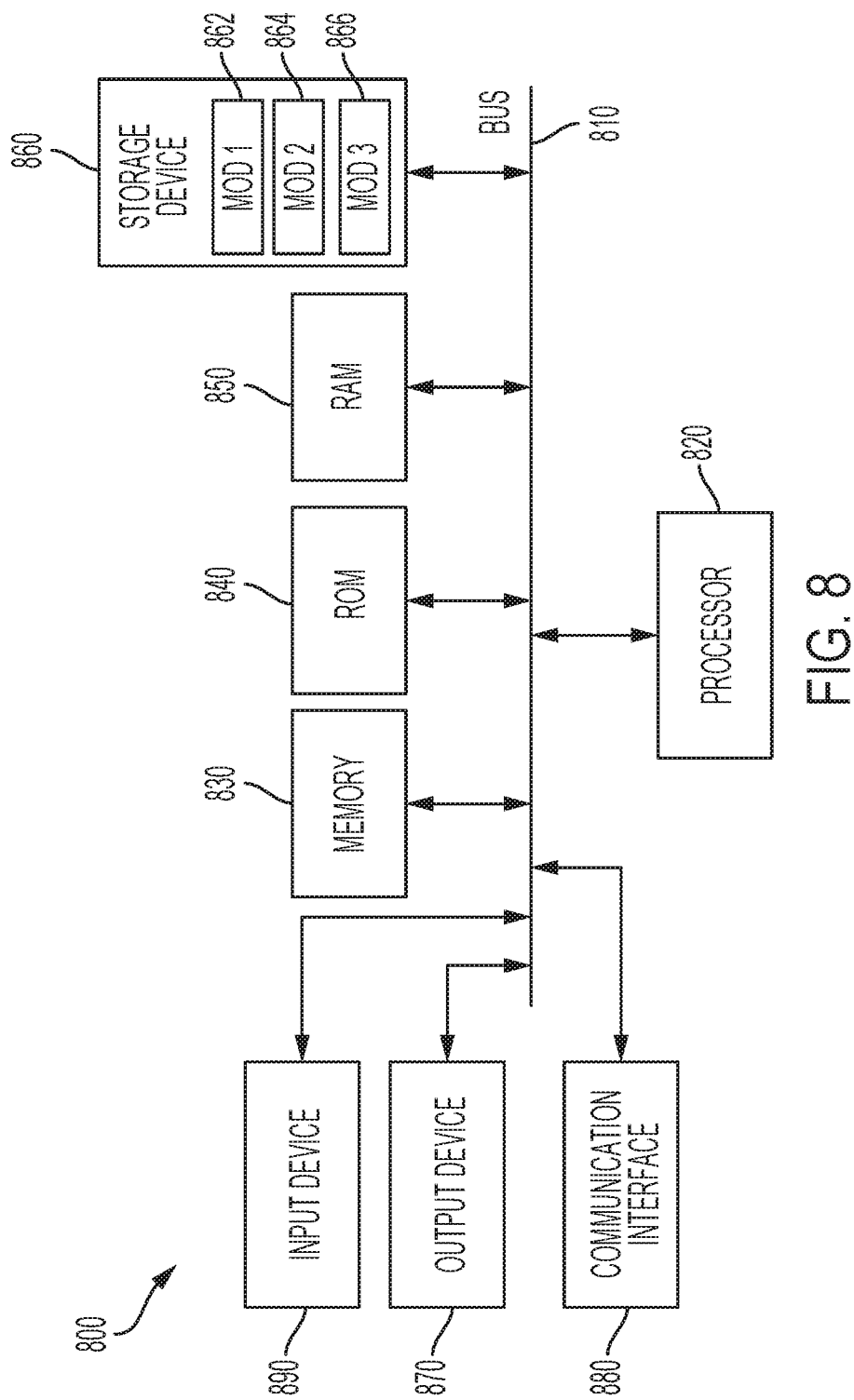
FIG. 8 illustrates an example computer system.

With reference to FIG. 8, an exemplary system includes a general-purpose computing device or system 800, including a processing unit (CPU or processor) 820 and a system bus 810 that couples various system components including the system memory 830 such as read-only memory (ROM) 840 and random-access memory (RAM) 850 to the processor 820. The system 800 can include a cache of high-speed memory connected directly with, in close proximity to, or integrated as part of the processor 820. The system 800 copies data from the memory 830 and/or the storage device 860 to the cache for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general-purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer-readable storage media provide nonvolatile storage of computer-readable instructions, data structures, program modules and other data for the computing device 800. In one aspect, a hardware module that performs a particular function includes the software component stored in a tangible computer-readable storage medium in connection with the necessary hardware components, such as the processor 820, bus 810, display 870, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 800 is a small, handheld computing device, a desktop computer, or a computer server.

Although the exemplary embodiment described herein employs the hard disk 860, other types of computer-readable media which can store data that are accessible by a computer, such as magnetic cassettes, flash memory cards, digital versatile disks, cartridges, random access memories (RAMs) 850, and read-only memory (ROM) 840, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method, comprising:
receiving, at a server from a remote terminal, a first request to remotely view a vehicle using an aerial drone, wherein the remote terminal electrically contacts the server across a network;
providing, from the server to the remote terminal, a list of predetermined views of the vehicle;
receiving, at the server from the remote terminal, a selection of a first predetermined view from the list of predetermined views;
generating a flight path for the aerial drone by:
  receiving current coordinates for the vehicle;
  receiving an orientation of the vehicle;
  calculating, based on the orientation and the list of predetermined views, a plurality of viewing vectors for a camera of the aerial drone which respectively correspond with the list of predetermined views for the vehicle;
  calculating, based at least in part on a wind speed at the vehicle, coordinates for the plurality of viewing vectors, where each coordinate in the coordinates corresponds to a viewing vector in the plurality of viewing vectors;
  identifying routes between the coordinates which are traversable by the aerial drone; and
  connecting the routes, forming the flight path;
transmitting, to the aerial drone from the server, the flight path;
receiving, at the server from the aerial drone, a video feed bitstream from the first predetermined view in the list of predetermined views, the first predetermined view generated by the aerial drone being located at a first location and the camera pointing at a corresponding first vector;
transmitting, from the server to the remote terminal, the video feed bitstream;
generating, using video streams from a plurality of cameras, locations of additional vehicles and human beings within a parking lot where the vehicle is located;
identifying which of the locations of additional vehicles currently have aerial drones assigned or have human beings present, resulting in occupied parking spaces;
determining that the vehicle is immediately proximate to at least one of the occupied parking spaces, resulting in at least one occupied parking space immediately proximate to the vehicle;
placing the aerial drone into a queue prior to transmitting the flight path to the aerial drone while the at least one occupied parking space immediately proximate to the vehicle continues to be occupied; and
directing the aerial drone in accord with the flight path to arrive at the vehicle, wherein the flight path routes around, above, or under a set of obstacles.

2. The method of claim 1, further comprising:
while continuing to transmit the video feed bitstream:
  receiving, at the server from the remote terminal, a second request to view a second predetermined view from the list of predetermined views;
  transmitting, to the aerial drone from the server using a wireless transmitter, instructions to move, according to the flight path, from the first location to a second location associated with the second predetermined view and adjust the camera to a second vector associated with the second predetermined view;
  receiving, at the server from the aerial drone, the video feed bitstream from the aerial drone at the second location with the camera pointed at the second vector; and
  transmitting, from the server to the remote terminal, the video feed bitstream of the second predetermined view.

3. The method of claim 2, further comprising:
receiving, at the server from the aerial drone, the video feed bitstream while the aerial drone is at the second location; and
transmitting, from the server to the remote terminal, the video feed bitstream of the aerial drone at the second location.

4. The method of claim 1, wherein while the video feed bitstream continues to transmit, the method further comprises:
receiving, at the server from the remote terminal, a request for a change in an amplification of video captured by the camera; and
transmitting, from the server to the aerial drone, instructions to change the amplification of the camera.

5. The method of claim 1, wherein the flight path further comprises, for each coordinate in the coordinates:
a latitude of the coordinate;
a longitude of the coordinate;
an altitude of the coordinate; and
an orientation of the camera.

6. The method of claim 5, wherein the flight path further comprises:
the routes between the coordinates link each coordinate in the coordinates to adjacent coordinates, such that the flight path encircles the vehicle.

7. The method of claim 5, wherein the latitude, the longitude, and the altitude of each coordinate within the coordinates of the flight path result in a constant distance of the aerial drone from edges of the vehicle while in the flight path.

8. The method of claim 1, further comprising:
generating a route for the aerial drone to the flight path through a parking lot where the vehicle is located, the route avoiding flying over parked vehicles and avoiding flight paths of other aerial drones.

9. The method of claim 1, wherein the identifying of the occupied parking spaces further comprises:
retrieving additional flight paths for additional aerial drones operating in the occupied parking spaces; and
determining that the flight path of the aerial drone would interfere with at least one of the additional flight paths for the additional aerial drones.

10. The method of claim 1, wherein the flight path encircles the vehicle, and wherein the flight path is closer to the vehicle when the wind speed is low than when windspeed is high.

11. A system, comprising:
a processor; and
a non-transitory computer-readable storage medium having instructions stored which, when executed by the processor, cause the processor to perform operations comprising:
  receiving, from a remote terminal, a request to remotely view a vehicle using an aerial drone;
  transmitting, to the remote terminal, a list of potential views of the vehicle;
  receiving, from the remote terminal, a selected view from the list of potential views of the vehicle;
  generating a first flight path for the aerial drone by:

receiving coordinates for the vehicle;
receiving an orientation of the vehicle;
calculating, based on the orientation and the list of potential views of the vehicle, a plurality of locations of the aerial drone which respectively allow a camera of the aerial drone to capture views from the list of potential views of the vehicle;
identifying routes between the plurality of locations which are traversable by the aerial drone; and
connecting the routes, forming the first flight path;
identifying a first location within the plurality of locations corresponding to the selected view;
generating a second flight path for the aerial drone by:
identifying flight paths of other aerial drones within a predetermined distance of the vehicle;
identifying locations of other vehicles within the predetermined distance of the vehicle; and
calculating a shortest path from a current location of the aerial drone to the first location while avoiding flight paths of the other aerial drones and not flying over the locations of the other vehicles, resulting in a second flight path;
transmitting, to the aerial drone using a wireless transmitter, the first flight path and the second flight path;
transmitting, to the aerial drone using the wireless transmitter, drone instructions for the aerial drone to proceed from the current location to the first location using the second flight path;
generating, using video streams from a plurality of cameras, locations of additional vehicles and human beings within a parking lot where the vehicle is located;
identifying which of the locations of additional vehicles currently have aerial drones assigned or have human beings present, resulting in occupied parking spaces;
determining that the vehicle is immediately proximate to at least one of the occupied parking spaces, resulting in at least one occupied parking space immediately proximate to the vehicle;
placing the aerial drone into a queue prior to transmitting the flight path to the aerial drone while the at least one occupied parking space immediately proximate to the vehicle continues to be occupied; and
directing the aerial drone in accord with the flight path to arrive at the vehicle, wherein the flight path routes around, above, or under a set of obstacles.

12. The system of claim 11, the non-transitory computer-readable storage medium having additional instructions stored which, when executed by the processor, cause the processor to perform operations comprising:
receiving, from a camera of the aerial drone, a video feed bitstream from the selected view; and
transmitting, to the remote terminal, the video feed bitstream.

13. The system of claim 12, the non-transitory computer-readable storage medium having additional instructions stored which, when executed by the processor, cause the processor to perform operations comprising:
receiving, from the remote terminal, a second selected view; and
transmitting, to the aerial drone, additional drone instructions to move to a second location within the first flight path, the second location corresponding to the second selected view.

14. The system of claim 11, wherein the first flight path further comprises, for each location in the plurality of locations:
a latitude of the location;
a longitude of the location;
an altitude of the location; and
an orientation of the camera.

15. The system of claim 14, wherein the first flight path further comprises:
routes from each location in the plurality of locations to adjacent locations within the plurality of locations, such that the first flight path encircles the vehicle.

16. The system of claim 14, wherein the latitude, the longitude, and the altitude of locations within the first flight path result in a constant distance of the aerial drone from edges of the vehicle while in the first flight path.

17. The system of claim 11, wherein the aerial drone is in a queue prior to transmitting the first flight path and the second flight path to the aerial drone.

18. The system of claim 11, wherein the first flight path encircles the vehicle, and wherein the first flight path is closer to the vehicle when wind speed is low than when windspeed is high.

19. A non-transitory computer-readable storage medium having instructions stored which, when executed by a processor, cause the processor to perform operations comprising:
receiving, at a server from a remote terminal, a first request to remotely view a vehicle using an aerial drone, wherein the remote terminal electrically contacts the server across a network;
providing, from the server to the remote terminal, a list of predetermined views of the vehicle;
receiving, at the server from the remote terminal, a selection of a first predetermined view from the list of predetermined views;
generating a flight path for the aerial drone by:
receiving coordinates for the vehicle;
receiving an orientation of the vehicle;
calculating, based on the orientation and the first predetermined view, coordinates for the first predetermined views of the vehicle;
transmitting the coordinates from the server to the aerial drone and instructing the aerial drone to proceed to the coordinates;
receiving, from the aerial drone, a video feed bitstream from a camera on the aerial drone while the aerial drone hovers at a specific location at the coordinates;
transmitting, to the remote terminal, the video feed bitstream while the aerial drone hovers at the specific location;
generating, using video streams from a plurality of cameras, locations of additional vehicles and human beings within a parking lot where the vehicle is located;
identifying which of the locations of additional vehicles currently have aerial drones assigned or have human beings present, resulting in occupied parking spaces;
determining that the vehicle is immediately proximate to at least one of the occupied parking spaces, resulting in at least one occupied parking space immediately proximate to the vehicle;
placing the aerial drone into a queue prior to transmitting the flight path to the aerial drone while the at least one occupied parking space immediately proximate to the vehicle continues to be occupied; and
directing the aerial drone in accord with the flight path to arrive at the vehicle, wherein the flight path routes around, above, or under a set of obstacles.

* * * * *